US009937843B2

(12) United States Patent
Birth

(10) Patent No.: US 9,937,843 B2
(45) Date of Patent: Apr. 10, 2018

(54) APPARATUS FOR HOLDING A LIQUID-FILLED VESSEL IN A VEHICLE

(71) Applicant: Bayerische Motoren Werke Aktiengesellschaft, Munich (DE)

(72) Inventor: Olga Birth, Unterfoehring (DE)

(73) Assignee: Bayerische Motoren Werke Aktiegesellschaft, Munich (DE)

(*) Notice: Subject to any disclaimer, the term of this patent is extended or adjusted under 35 U.S.C. 154(b) by 0 days.

(21) Appl. No.: 14/630,269

(22) Filed: Feb. 24, 2015

(65) Prior Publication Data

US 2015/0239382 A1  Aug. 27, 2015

(30) Foreign Application Priority Data

Feb. 24, 2014 (DE) .................. 10 2014 203 204

(51) Int. Cl.
*B60Q 1/00* (2006.01)
*B60N 3/10* (2006.01)

(52) U.S. Cl.
CPC ............... *B60N 3/104* (2013.01); *B60N 3/10* (2013.01)

(58) Field of Classification Search
CPC .......... G06K 19/0705; G06K 19/0716; G06K 19/0723; G06K 19/07345; G06K 19/07798; A47F 3/0439; A47F 3/0469; A47F 3/0478; E05B 65/0021; E05B 47/0004; E05B 65/0042; G08B 21/182; G08B 21/02; A01N 59/00; A01N 59/02; A23G 9/045; A23G 9/22; A23B 7/144; A23B 9/18; A23B 4/16
USPC ... 340/439, 3.4, 988, 438, 426.34, 436, 446, 340/447, 449, 450, 457.3, 458, 488
See application file for complete search history.

(56) References Cited

U.S. PATENT DOCUMENTS

| 4,545,213 A * | 10/1985 | Fujiwara ................ B60H 1/005 62/158 |
| 9,035,222 B2 * | 5/2015 | Alexander .................. 165/58 |
| 9,265,371 B2 * | 2/2016 | Glucksman ........ A47G 19/2288 |
| 2004/0195231 A1 * | 10/2004 | Bond ..................... H05B 6/687 219/400 |
| 2006/0186297 A1 * | 8/2006 | Lore, Sr. ................ B60N 3/103 248/311.2 |
| 2006/0214765 A1 * | 9/2006 | Pitchers ............ G06K 19/0705 340/3.4 |
| 2009/0095165 A1 * | 4/2009 | Nosler .................. A47J 31/007 99/289 R |

(Continued)

FOREIGN PATENT DOCUMENTS

| DE | 10 2011 088 015 A1 | 6/2013 |
| EP | 0 438 371 A2 | 7/1991 |
| JP | 60-179344 A | 9/1985 |

OTHER PUBLICATIONS

German Search Report dated Jul. 16, 2014 with English Translation (eleven (11) pages).

*Primary Examiner* — Daniel Previl
(74) *Attorney, Agent, or Firm* — Crowell & Moring LLP

(57) ABSTRACT

An apparatus for holding a liquid-filled vessel includes a temperature sensor for sensing a temperature related to the temperature of the liquid in the vessel and a control unit connected to the temperature sensor. The control unit takes the sensed temperature as a basis for prompting an action. At a sensed temperature that is above a prescribed hot temperature limit value, the control unit then activates and/or influences a function that increases the safety of the vehicle occupant.

20 Claims, 2 Drawing Sheets

(56) References Cited

U.S. PATENT DOCUMENTS

2010/0295707 A1* 11/2010 Bennie .................. B60W 40/09
                                                        340/988
2011/0072978 A1*  3/2011 Popescu ................. A47G 19/14
                                                         99/288

* cited by examiner

APPARATUS FOR HOLDING A LIQUID-FILLED VESSEL IN A VEHICLE

CROSS REFERENCE TO RELATED APPLICATION

This application claims priority under 35 U.S.C. § 119 from German Patent Application No. 10 2014 203 204.0, filed Feb. 24, 2014, the entire disclosure of which is herein expressly incorporated by reference.

BACKGROUND AND SUMMARY OF THE INVENTION

The invention relates to an apparatus for holding a liquid-filled vessel in a vehicle equipped with a temperature sensor for sensing a temperature related to the temperature of the liquid in the vessel and a control unit connected to the temperature sensor.

Apparatuses for holding liquid-filled vessels have already been known for a long time. What are known as "cupholders" are used to stow beverages in the form of cups or bottles safely during the journey. The arrangement of the cupholder in proximity to the driver means that the beverage is always at hand for the driver even during the journey.

DE 10 2011 088 015 A1 already discloses a holding system for vessels having a heating and cooling device, which holding system is optimized for convenience and involves a temperature sensor being able to be used to sense the external vessel wall temperature and the sensed temperature being able to be taken as a basis for cooling or heating the content in the vessel. The control unit that controls the heating or cooling mode may also be able to be connected to a display operator control unit, so that, by way of example, it is possible for the color of the ambient lighting to be controlled or for audible information to be output.

It is an object of the present invention to provide an apparatus for holding a liquid-filled vessel in vehicles that has been developed further with regard to safety for the driver.

This and other objects are achieved by an apparatus for holding a liquid filled vessel in a vehicle having a temperature sensor for sensing a temperature related to the temperature of the liquid in the vessel and a control unit connected to the temperature sensor. The control unit takes the sensed temperature as a basis for prompting an action, wherein at a sensed temperature that is above a prescribed hot temperature limit value, the control unit activates and/or influences a function that increases the safety of the vehicle occupant.

The invention is based on a fundamentally known apparatus for holding a liquid-filled vessel, which apparatus includes a temperature sensor for sensing a temperature related to the temperature of the liquid in the vessel. The temperature sensor is connected to a control unit that takes the sensed temperature as a basis for prompting an action.

The invention is based on the insight that detection of a hot beverage for the driver can prompt the occurrence of various safety-critical states from which the driver needs to be protected. Taking account of this insight, the apparatus according to the invention is distinguished in that at a sensed temperature that allows a very hot beverage to be inferred, that is to say is above a prescribed hot temperature limit value, the control unit activates or influences a function that increases the safety of the vehicle occupant. The temperature sensor may be arranged in the base of the holding apparatus, for example, and in this way can measure the temperature of the vessel, from which it is in turn possible to infer the temperature of the content. As a temperature sensor, it is also possible to use a (infrared) sensor for contactless temperature measurement that is arranged in the vehicle such that it can measure the surface temperature of the liquid directly.

By way of example, there is thus the danger for an inattentive driver, when taking the vessel from the bracket in order to drink, that he is unaware of the hot temperature and scalds himself when drinking. This can, in turn, lead to a safety-critical situation for himself, as well as for other road users, since the pain means that he is no longer completely in control of driving the vehicle.

On the basis of the above considerations, one advantageous embodiment of the apparatus according to the invention provides that at a sensed temperature that is above a prescribed hot temperature limit value, the control unit prompts a first output of information to the driver when the liquid-filled vessel is removed from the holding apparatus. By way of example, removal of the vessel can be identified by evaluation of the signal from a contact switch arranged in the holding apparatus and/or by evaluation of a signal from an interior camera. By way of example, in the case of a cardboard cup, a temperature sensor integrated in the cupholder can very easily be used to establish the temperature of the beverage in the cup. If the beverage is now at very high temperatures, that is to say is above the prescribed hot temperature limit value, and it is identified that the cup is removed from the bracket, the driver can be warned by an appropriate warning that he could possibly scald himself if he drinks the beverage.

Advantageously, the first output of information or warning prompted can be a visual, audible and/or haptic warning signal. In this case, ideally, a graphical interface of a display unit in a vehicle is used to indicate to the driver in real time when the beverage is too hot. To improve convenience, it is also possible to indicate to the driver when the beverage is likely to be at an agreeable temperature for him. This means that the driver does not constantly need to grasp the cup in order to check whether the temperature is agreeable. A distinction between red (much too hot), orange (just right) and blue (cold) facilitates classification of the temperature for the driver.

If the temperature sensor is used to establish that the beverage is very hot and if it is possibly additionally possible to use appropriate sensors to establish that the beverage is a caffeine-containing beverage (e.g. coffee), it is possible to infer from this that the driver could be tired and that the driver is therefore not fully attentive, i.e. the temperature of the beverage is used as an indicator of possible tiredness in the driver.

Accordingly, in a further (additional or alternative) advantageous embodiment of the invention, there may be provision that at a sensed temperature that is above a prescribed hot temperature limit value, the control unit activates a function that assesses driver attentiveness, or influences said function such that further attentiveness checks with increased sensitivity are performed so as to be able to identify the attentiveness state of the driver. If a low level of driver attentiveness is ascertained or presumed, an attentiveness-influencing second output of information to the driver is prompted.

Advantageously, the function that assesses driver attentiveness may be embodied such that the steering wheel movement and/or the braking force when the brake pedal is operated are taken as a basis for ascertaining the attentive state of the driver. If no steering wheel movement for a relatively long time or very abrupt steering wheel movement is identified, for example, it is assumed that the driver is following the current traffic scenario only to a small degree.

If only a low level of driver attentiveness is detected, it is advantageously possible for a warning signal and/or recommendation signal for the initiation of prescribed actions that increase driver attentiveness to be prompted as a second output of information and/or for automatic performance of actions that increase driver attentiveness to be prompted. In this case, it is possible, by way of example, for the driver to be asked to take a break or to tune to a different radio station with faster pieces of music. A change of radio station or of music to be played can also be made automatically in this case. It would likewise be conceivable for a window to be opened briefly (slightly) in order to get fresh air into the vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
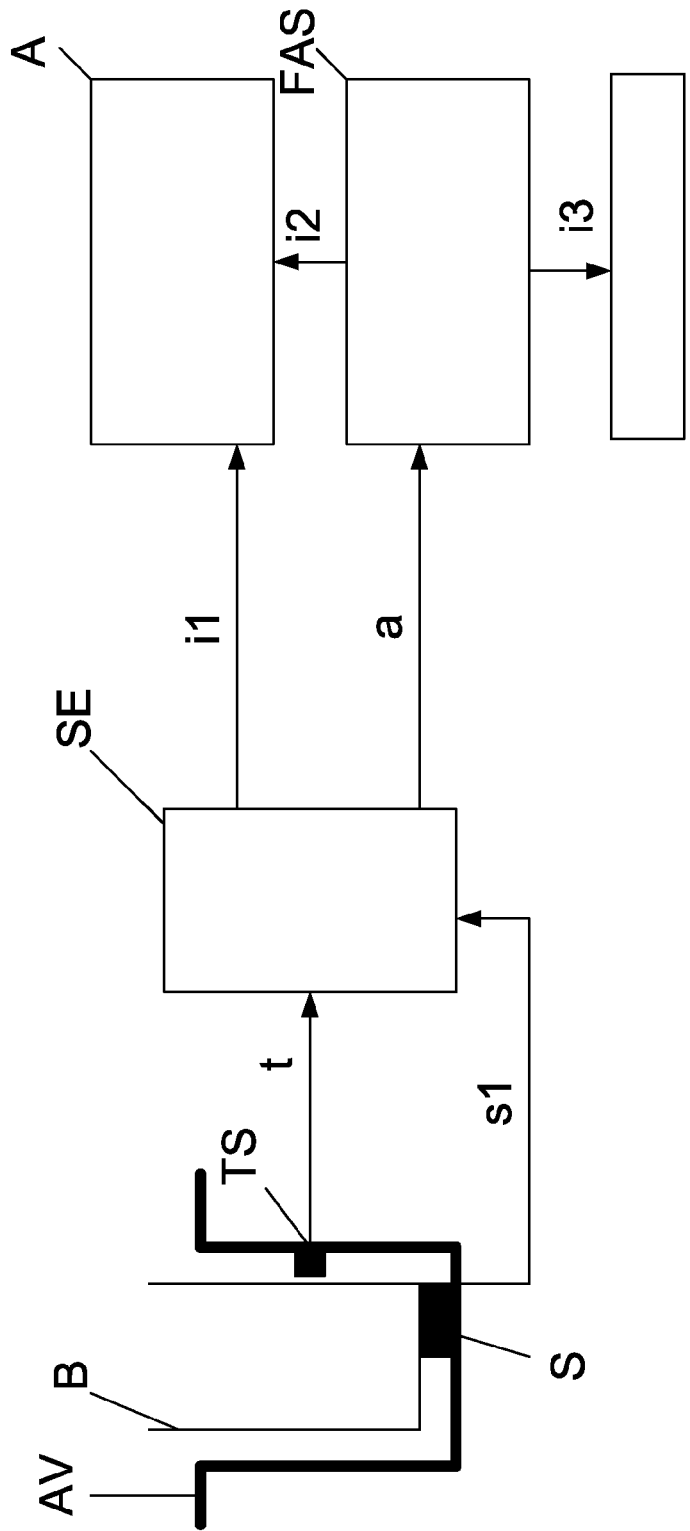
FIG. 1 is a block diagram of a simplified design of an apparatus according to an embodiment of the invention for holding a vessel in the vehicle.

FIG. 1 shows a holding apparatus AV for holding a liquid-filled cup B. The holding apparatus AV has a temperature sensor TS for sensing the cup wall temperature t and has a switch S, arranged in the base of the holding apparatus AV, for detecting the presence of the cup B in the holding apparatus AV. If there is no cup in the holding apparatus AV, the switch is open and no signal is sent. If there is a cup B in the holding apparatus AV, however, then the switch S is closed by the cup B and a signal s1 is sent.

Both the temperature sensor TS and the switch S are connected to a central control unit SE that receives a temperature signal t from the temperature sensor TS and a closure signal s1 from the switch (when the switch is closed).

The control unit SE is connected to a display unit A that takes the sent signal i1 from the control unit SE as a basis for activating or deactivating a corresponding display. In addition, the control unit is connected to a function FAS that detects driver attentiveness, which function, upon a signal a from the control unit SE, prompts a precise check on driver attentiveness with appropriately sensitized limit values and, when required, then sends a signal i2 to the display unit A for the purpose of activating a particular display and a signal i3 to a further apparatus V for the purpose of initiating particular countermeasures. The function FAS that checks driver attentiveness may be part of the control unit SE or may be implemented in a separate control unit SE.

Figure 2:
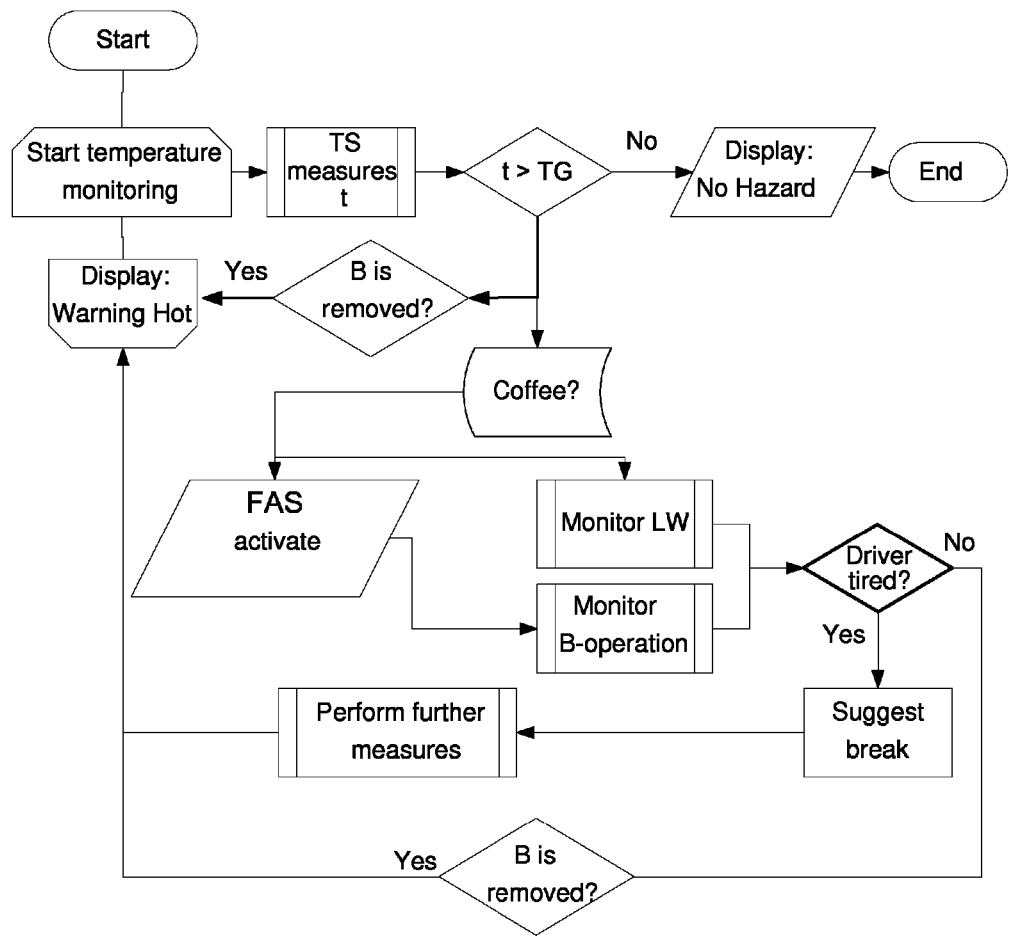
FIG. 2 is a simplified flowchart illustrating control implemented in the control unit for influencing a function, which increases the safety of the vehicle occupant, on the basis of the ascertained temperature of a liquid-filled vessel located in a holding apparatus.

A specific method sequence for taking the ascertained temperature of a liquid-filled vessel arranged in the holding apparatus as a basis for activating and/or influencing a function that increases the safety of the occupant will now be illustrated on the basis of the following explanations pertaining to FIG. 2.

The sequence starts (shown top left) with temperature monitoring by the temperature sensor TS as soon as a cup B is detected in the holding apparatus. The temperature sensor TS measures the temperature t of the cup and sends this signal to the control unit SE. The control unit SE checks whether the temperature t is greater than a defined hot temperature limit value TG. If this is not the case, a display is activated indicating that the beverage is at a good temperature and there is no danger of scalding for the driver.

However, if it is established that the temperature t of the cup is greater than the defined hot temperature limit value TG, then first of all—if an appropriate sensor is in place—the further sensor (e.g. camera or odor sensor) is used to establish whether the beverage is coffee. If the beverage is identified as coffee, a function FAS that ascertains driver attentiveness has its identification of driver inattentiveness influenced in the next step to the effect that the limit value thresholds at which it is established that a driver is inattentive are lowered. Alternatively, corresponding identification of coffee can also prompt the function FAS that ascertains driver attentiveness to be started only then. If there are no sensors in place for identifying coffee in the vehicle, the function FAS can also be started directly or—as explained above—have its sensitivity influenced when a hot beverage is identified.

As part of the function FAS that detects the attentiveness of the driver, the steering angle LW and operation of the brake pedal are then monitored and the corresponding data are taken as a basis for identifying that a driver is inattentive or tired. So long as a normal change of steering angle and normal operation of the brake pedal are sensed, the driver is not established as being tired and an "Attention! Hot!" display is activated only when removal of the cup B from the holding apparatus is identified.

If a driver is identified as being tired, however, first of all a break is proposed to the driver and then further measures raising the attentiveness of the driver are performed, such as opening the window or automatically tuning to a radio station with fast pieces of music, for example.

Similarly, an "Attention! Hot!" display can be started regardless of the type of hot beverage if it is identified that the cup with the hot beverage is removed from the holding apparatus AV.

The monitoring of the temperature of the beverage in the cupholder and the evaluation with respect to a danger that exists for the driver (e.g. as a result of scalding or inattentiveness) that are proposed here allow a significant increase in the safety of the driver, and possibly also of other road users.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for holding a vessel in a vehicle, comprising:
    a temperature sensor configured to sense a temperature of liquid in the vessel; and
    a control unit coupled to the temperature sensor, wherein the control unit is configured such that if the sensed temperature of the liquid exceeds a threshold temperature that is likely to lead to scalding of an occupant, the control unit;

i) outputs a first signal that addresses a first danger arising from a given physical property of the liquid,
ii) infers that the liquid is a particular type of drink based on the given physical property of the liquid, and
iii) outputs a second signal that addresses a second danger arising from a physical state of the driver, if the liquid is inferred as being the particular type of drink.

2. The apparatus according to claim 1, wherein the first signal is output in response to the liquid-filled vessel being removed from a holder of the apparatus.

3. The apparatus according to claim 2, further comprising:
a contact switch arranged in the holder and/or an interior camera; and
wherein removal of the liquid-filled vessel from the holder is identified by evaluating a signal from the contact switch and/or a signal from the interior camera.

4. The apparatus according to claim 3, wherein an output of the first signal is at least one of a visual, audible or haptic warning signal.

5. The apparatus according to claim 2, wherein an output of the first signal is at least one of a visual, audible or haptic warning signal.

6. The apparatus according to claim 2, wherein the second danger is related to driver attentiveness and the second signal is activated or influenced by the control unit; and
wherein upon ascertaining a low level of driver attentiveness, the control unit prompts the output of the second signal.

7. The apparatus according to claim 6, wherein steering wheel movement and/or braking force via brake pedal operation are taken as a basis for ascertaining driver attentiveness.

8. The apparatus according to claim 6, wherein the second signal is a warning signal and/or recommendation signal for initiating prescribed actions to increase driver attentiveness.

9. The apparatus according to claim 6, wherein the second signal is an automatic performance of actions that increase driver attentiveness.

10. The apparatus according to claim 1, wherein the second danger is related to driver attentiveness and the second signal is activated or influenced by the control unit; and
wherein upon ascertaining a low level of driver attentiveness, the control unit prompts the output of the second signal.

11. The apparatus according to claim 10, wherein steering wheel movement and/or braking force via brake pedal operation are taken as a basis for ascertaining driver attentiveness.

12. The apparatus according to claim 10, wherein the second signal is a warning signal and/or recommendation signal for initiating prescribed actions to increase driver attentiveness.

13. The apparatus according to claim 10, wherein the second signal is an automatic performance of actions that increase driver attentiveness.

14. A method of operating an apparatus for holding a liquid-filled vessel in a motor vehicle, the method comprising the acts of:
sensing, via a temperature sensor, a temperature of a liquid in the liquid-filled vessel;
determining, via a control unit coupled to the temperature sensor, if the temperature of the liquid in the liquid-filled vessel exceeds a threshold temperature that is likely to lead to scalding of an occupant; and
if the sensed temperature of the liquid exceeds the threshold temperature, the control unit is configured to:
i) output a first signal that addresses a first danger arising from a given physical property of the liquid,
ii) infer that the liquid is a particular type of drink based on the given physical property of the liquid, and
iii) output a second signal that addresses a second danger arising from a physical state of the driver, if the liquid is inferred as being the particular type of drink.

15. The method according to claim 14, further comprising the act of:
detecting whether the liquid-filled vessel is removed from a holder of the apparatus, wherein
the first signal is output if the liquid-filled vessel is determined to be removed from the holder, and
the first signal is a visual, audible and/or haptic warning signal.

16. The method according to claim 15, wherein
the second danger is related to driver attentiveness and the second signal is activated or influenced by the control unit, and
the second signal is output when the control unit determines a low level of driver attentiveness.

17. The method according to claim 16, wherein the control unit utilizes steering wheel moment and/or braking force as a basis for determining attentiveness.

18. The method according to claim 16, wherein the second signal is a warning signal and/or recommendation signal for initiating prescribed actions to increase driver attentiveness.

19. The method according to claim 16, wherein the second signal is an automatic performance of actions that increase driver attentiveness.

20. The method according to claim 14, wherein
the second danger is related to driver attentiveness and the second signal is activated or influenced by the control unit, and
the second signal is output when the control unit determines a low level of driver attentiveness.

* * * * *